United States Patent
McMann

(10) Patent No.: US 10,372,614 B1
(45) Date of Patent: Aug. 6, 2019

(54) SMART DATA ENGINE SYSTEM AND METHOD

(71) Applicant: BizNet Software, Inc., Dallas, TX (US)

(72) Inventor: George McMann, Tyler, TX (US)

(73) Assignee: BizNet Software, Inc., Dallas, TX (US)

( * ) Notice: Subject to any disclaimer, the term of this patent is extended or adjusted under 35 U.S.C. 154(b) by 248 days.

(21) Appl. No.: 15/296,659

(22) Filed: Oct. 18, 2016

(51) Int. Cl.
  *G06F 17/30* (2006.01)
  *G06F 12/0888* (2016.01)
  *G06F 16/28* (2019.01)
  *G06F 16/2457* (2019.01)

(52) U.S. Cl.
  CPC .... *G06F 12/0888* (2013.01); *G06F 16/24575* (2019.01); *G06F 16/284* (2019.01); *G06F 2212/60* (2013.01)

(58) Field of Classification Search
  CPC ......... G06F 17/30528; G06F 17/30595; G06F 16/284; G06F 16/24575
  USPC ....................................................... 707/769
  See application file for complete search history.

(56) References Cited

U.S. PATENT DOCUMENTS

2015/0370828 A1\* 12/2015 Maurer ............ G06F 17/30061 707/722

\* cited by examiner

*Primary Examiner* — Joshua Bullock
(74) *Attorney, Agent, or Firm* — Kirby Drake

(57) ABSTRACT

The Smart Data Engine may cache data in an intelligent way which may minimize retrieval times and simplify authentication. A data cache may be maintained on the local computer that is ready to be retrieved and is tailored to the user. This avoids repeated requests of the same set of data. An additional cache may be maintained and tailored for Aggregations on the local computer ready to be retrieved. End users may retrieve data in a usable format and then easily create ad hoc reporting or perform analysis on the exposed data on the fly. An end user may select from defined ready-to-use SmartViews of data and determine policies of the cached data as needed. This solution may simplify connectivity to multiple types of data sources, including but not limited to, cloud data, relational databases, as well as on-premise/off-premise data.

29 Claims, 7 Drawing Sheets

SMART DATA ENGINE SYSTEM AND METHOD

FIELD OF THE DISCLOSURE

The present disclosure generally relates to business reporting, and more specifically, business reporting through a Smart Data Engine.

BACKGROUND

In order to answer questions and analyze business information, end users traditionally have to initiate requests for information each time it is needed, scrub large sets of data, and filter this data in connection with each request. Companies have traditionally stored business data in local relational databases; however, companies are moving more and more of their data to the cloud. This results in many companies having critical business data in both local relational databases as well as in the cloud. Having data from multiple mixed data sources complicates retrieval times and creates difficulties in presenting the data to the user in a cohesive as well as efficient manner. The end user requires a fast and flexible run time solution to automatically connect, choose, and analyze large sets of data in a usable format from the cloud or legacy systems in a cost-effective manner.

In traditional local relational databases, online analytical processing (OLAP) cubes and data marts may be used to help end users report and analyze large sets of data. This can be effective; however, there can be several drawbacks including lack of flexibility in the way that data is stored and the total cost of ownership. Standard reporting requirements can be used to determine the most common data sets that are returned; however, in many cases, the user is performing ad hoc reporting to solve a specific problem or analyze a trend. The costs to implement these solutions, the costs for maintenance, and the costs to make design changes for reporting can be extremely high.

Companies are moving more of their business data to the cloud; however, a large portion of business data remains in local relational databases. Reporting on data located in the cloud as well as data located in local relational databases can be extremely difficult.

Some companies are trying to address these challenges by moving data from local relational databases to the cloud in order to bring all of the business data together in a central location for analysis and reporting purposes. There can be drawbacks to this approach. For example, companies must pay storage fees in order for data to reside in the cloud. Further, when all business data resides in the cloud, the cloud provider controls the speed with which data travels through use of application programming interface (API) calls. In addition, each time a request for data is made, a company may incur an associated charge for the API call to be made.

SUMMARY

Embodiments of the present disclosure may provide a method for caching data, the method comprising receiving a first Engine Request, the Engine Request potentially including a Request Type of Aggregation; querying whether a DataCache item exists for the first Engine Request; issuing a Data Request to execute a SmartView when no DataCache item exists for the Engine Request; returning a DataCache item in response to the Data Request; querying whether a ReadyCache item exists for the Request Type of Aggregation; and executing an Aggregation against the DataCache item when a ReadyCache item does not exist. The DataCache item returned in response to the Data Request may be added to DataCache. The ReadyCache item returned in response to the Aggregation may be added to an in-memory ReadyCache, and the ReadyCache item may be fetched from the in-memory ReadyCache.

A second Engine Request may be made, the second Engine Request having an identical Request Type and Filter/Criteria as the first Engine Request; querying whether a DataCache item exists matching the additional Engine Request; querying whether the DataCache item is valid and needs Sync, when a DataCache item exists matching the second Engine Request; querying whether a ReadyCache item exists for the Request Type of Aggregation; The method may then comprise fetching the ReadyCache item from the in-memory ReadyCache when a ReadyCache item exists for the Request Type of Aggregation.

Other steps in the method may include making an additional Engine Request, the additional Engine Request having an identical Request Type but different Filter/Criteria as the first Engine Request; querying whether a DataCache item exists matching the additional Engine Request; querying whether the DataCache item is valid and needs Sync, when a DataCache item exists matching the second Engine Request; querying whether a ReadyCache item exists for the Request Type of Aggregation; and executing Aggregation against the DataCache item to return a ReadyCache item when a ReadyCache item does not exist for the Request Type of Aggregation. The method also may include adding the returned ReadyCache item to ReadyCache; and fetching the ReadyCache item from the in-memory ReadyCache. An additional Engine Request may be made, the additional Engine Request having an identical Request Type and Filter/Criteria as the first Engine Request. Other steps may include querying whether a DataCache item exists matching the additional Engine Request; querying whether the DataCache item is valid and needs Sync; issuing a Data Request to execute SmartView when the DataCache item is not valid and needs Sync; and adding a resultant DataCache item to DataCache overwriting an existing DataCache item and disposing of existing ReadyCache items associated with the existing DataCache item. A query may be made to determine whether a ReadyCache item exists for the Request Type of Aggregation. The Aggregation may be executed against the resultant DataCache item when no ReadyCache item exists for the Request Type of Aggregation; and the resultant ReadyCache item may be added to the in-memory ReadyCache. The resultant ReadyCache item may be fetched from the in-memory ReadyCache; and the resultant ReadyCache item may be returned to a user.

Other embodiments of the present disclosure may provide a method for processing an Engine Request, the method comprising checking a DataCache for a DataCache item; querying whether the DataCache item is in-memory; querying whether the DataCache item is on disk when the DataCache item is not in-memory; and querying whether the DataCache item needs Sync. The method also may include de-serializing the DataCache item and associated ReadyCache items when the DataCache item is on disk. The method may further comprise checking ReadyCache for a ReadyCache item when no Sync is needed and the Engine Request includes a Request Type of Aggregation; executing Aggregation when the ReadyCache item is not found in-memory; and returning the ReadyCache item. The ReadyCache item may be added to ReadyCache after executing Aggregation when the ReadyCache item is not found in-memory. Filter/Criteria may be applied when no Sync is needed and the Engine Request includes a Request Type of DataSet, and a DataSet may be returned.

Additional embodiments of the present disclosure may provide a method of processing a Data Request, the method comprising: querying whether there is an existing DataCache item; executing SmartView; setting a creation date on a DataCache item; deleting the existing DataCache item and removing associated ReadyCache items from ReadyCache; adding the DataCache item to DataCache; and processing an Engine Request. The SmartView execution may occur when one of the following items is true: there is no existing DataCache item; there is an existing DataCache item and the DataCache item is invalid. The method may further comprise merging SmartView into the existing DataCache item when there is an existing DataCache item and SmartView does support delta. The method also may comprise querying whether another Data Request is currently processing.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

End users of business data are spending more and more time gathering data, creating reports, and analyzing the data once it is in a usable format. This aggregation and analysis has become more difficult as companies store their data in multiple places, both on premises as well as in the cloud; not only because of having multiple databases in which data is stored, but also because it is hard to configure the sources in such a way that the data is uniform and meets the needs of the end users. Embodiments of the present disclosure tackle the problems inherent in current business reporting solutions which include predetermined data storage that is set without knowledge of the end user's requirements, long retrieval times, and design/maintenance costs of data which typically increase as data sources expand and become more complex.

Figure 1:
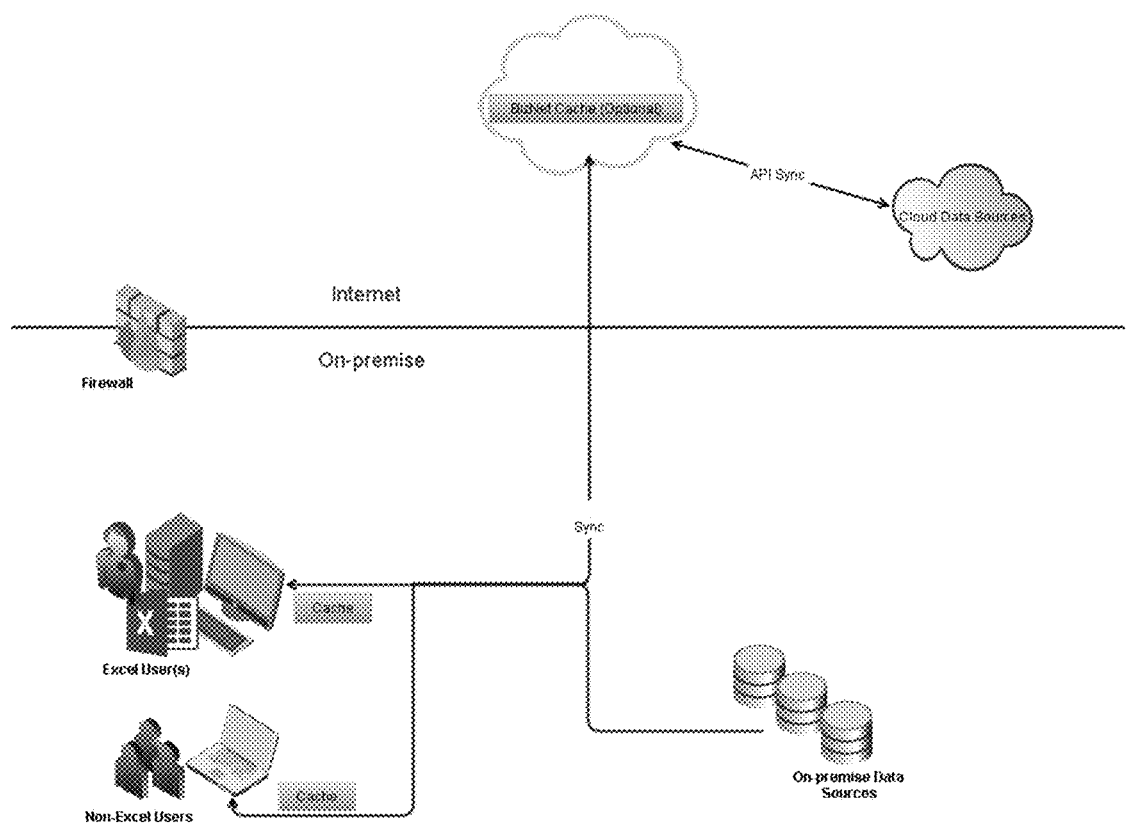
FIG. 1 depicts data sources and caches according to an embodiment of the present disclosure.

In a company, different types of users can request either the same type of data or different subsets of data. This data might be located in an on-premise data source or an off-site data source, such as in the cloud, such as depicted in FIG. 1. When an end user requests data, embodiments of the present disclosure may first look at the local desktop cache (FIG. 1) to see if the data is already stored there. If the data has been previously requested, a copy will already be saved within the local desktop cache via the Smart Data Engine. If the data is being requested for the first time or there have been updates to previously requested data, the Smart Data Engine according to embodiments of the present disclosure may then request the new data from the data source housing the data, whether it be on premises or in the cloud. The newly requested data may then be serialized to disk for future use.

In order to appreciate operation of the Smart Data Engine according to embodiments of the present disclosure, a few examples showing use during the course of a day may be illustrative.

At 8 am on Monday morning, a user may start a session. Upon starting the session, the Smart Data Engine also may start. "Smart Data Engine" may refer to the overall collection of concepts related to the reduction of repeated requests for the same data against a given data source. A data source may include but is not limited to a relational database, a flat file and/or a third-party data feed. The locality of a data source may be on-premise, hosted or in the cloud.

When the Smart Data Engine starts, the DataCache and ReadyCache may be empty. "DataCache" refers to a collection of DataCache items. "DataCache items" may refer to the result of a SmartView (i.e., a query representing a denormalized view of data formatted two-dimensionally as rows and columns) executed against a data source. A DataCache item may be stored in-memory (i.e., stored in the computer's local Random Access Memory (RAM)) or it may be serialized (translated for storage on the computer's local disk drive and placed in a file or database).

A user may make an Engine Request. This Engine Request may include one or more items, including but not limited to, a SmartView name (i.e., "GL Account Balances"), a Request Type, an operation and Filter/Criteria, such as ReadyCache and DataCache parameters.

A "Request Type" may be a categorization of requests, and in some embodiments of the present disclosure, valid values may be Aggregation or DataSet. "Aggregation" may refer to a request to calculate or compute against a DataCache item based on the operation specified and in conjunction with Filter/Criteria specified. The result of Aggregation may be a ReadyCache item that may be stored in ReadyCache. A ReadyCache item may be stored as a string, although the result may be a number depending on the operation being performed. It should be appreciated that a ReadyCache item may be stored in-memory or may be serialized.

Filter/Criteria may be a collection of DataCache parameters and ReadyCache parameters to apply during a Data Request, Aggregation or DataSet. A "DataCache parameter" may be a three-part identifier containing the column name (i.e., a sequence of characters used to identify a column within SmartView) within a specified SmartView, an operator on the column name, and a value for comparison. This parameter may be applied directly to the SmartView. A "ReadyCache parameter" may be a three-part identifier containing the column name within a specified SmartView, an operator on the column name, and a value for comparison. This parameter may be applied directly to the DataCache item. As discussed above, an operator may be specified within a DataCache parameter or a ReadyCache parameter. Valid values for an operator may be less than (<), greater than (>), equal (=) or not equal (!=), less than or equal to (<=), greater than or equal to (>=), wildcard (LIKE), list of values (IN), and excluding list of values (NOT IN).

In an embodiment of the present disclosure, the Request Type for SmartView name ("GL Account Balances") may be Aggregation. The operation may be SUM(MTDNet), and Filter/Criteria may include the following: ReadyCache parameter: Account='1000'; DataCache parameter: Fiscal Year='2016'; DataCache parameter: Fiscal Period='5'. As reflected in this embodiment of the present disclosure, Filter/Criteria may include more than one DataCache parameter.

Once the Engine Request has been made, DataCache may be checked to see if any DataCache items match the SmartView name and DataCache parameters. In this embodiment of the present disclosure, there is no matching DataCache item for this request, and accordingly, a Data Request may be issued. The Data Request may be a request for the creation of a DataCache item from a SmartView. The Data Request may be implicitly initiated by a user action or by another process invoked programmatically in embodiments of the present disclosure.

The Data Request executes the SmartView by calling a Connector. A "Connector" is a domain-specific method of executing a SmartView. Connectors may be specific to a given data source. This could include, but is not limited to, multiple calls to an API, a set of queries against a relational database, or loading a file from a disk. In this embodiment of the present disclosure, the specific Connector may be BizNet. The Connector may call the BizNet Gateway by sending an XML request using the DataCache parameters as Filter/Criteria. The request may return 12,000 rows in 60 seconds in this embodiment of the present disclosure. The Connector may make 12 calls in total, with each call returning 1,000 records/rows and taking approximately 5 seconds per call. The Smart Data Engine may mark the "created date" for the DataCache item as the start time of the Data Request. "Created date" may be stamped on each DataCache item and may refer to the date/time that the request was made to the originating data source. In this embodiment of the present disclosure, this may be 05/06/16 08:00:00 AM. The resulting DataCache item, which may contain the balance for all accounts for May 2016 in this embodiment of the present disclosure, may be added to the DataCache. The Data Request is then complete and the processing of the Engine Request may continue.

As previously discussed, in this embodiment of the present disclosure, the Request Type is an Aggregation of monthly balance and the operation is (SUM(MTDNET)). The ReadyCache parameter (AccountNo='1000') may be applied to a DataCache item matching the SmartView name and DataCache parameters. The resulting rows of data may be used to compute the SUM of the MTDNet column. In this embodiment of the present disclosure, the result of the computation is $240,687.13. The Aggregation result may then be stored in a ReadyCache item and associated with a DataCache item. The ReadyCache item may then be added to ReadyCache. At this point, the Engine Request may be considered complete and the result of $240,687.13 is sent back to the user. In this embodiment of the present disclosure, the total time from the user initiating the request may be less than 1 minute, 1 second in duration.

In an embodiment of the present disclosure, approximately 30 minutes after making the first Engine Request, the user may make another Engine Request. This Engine Request may include an identical Request Type and SmartView name but different Filter/Criteria. In this Engine Request, the Filter/Criteria may be: ReadyCache parameter: Account='4020'; DataCache parameter: Fiscal Year='2016'; DataCache parameter: Fiscal Period='5'. The DataCache may be checked to see if any DataCache items match the SmartView name and DataCache parameters. A DataCache item may exist matching the SmartView name and DataCache parameters.

A Refresh Interval may specify how long data is valid in DataCache. It may be global and apply to all data within DataCache. The Refresh Interval may be expressed in minutes. In this embodiment of the present disclosure, as the Refresh Interval may be set to 1 hour, only 30 minutes have elapsed since the DataCache item was created, falling 30 minutes below the threshold for calling Sync. "Sync" is the process of pulling or pushing data between one or more endpoints. These endpoints may be additional Smart Data Engines or may be the original data source. When Sync is complete, DataCache items may match the original data source.

Returning to this embodiment of the present disclosure, as the DataCache item is valid, ReadyCache may be checked for a matching ReadyCache item using the SmartView name, DataCache parameters, and ReadyCache parameters. In this embodiment, a match is not found so the requested Aggregation must be processed. Again, the Request Type is an Aggregation of monthly balance and the operation is (SUM(MTDNET)). The ReadyCache parameter may be applied to a DataCache item matching the SmartView name and DataCache parameters. The resulting rows of data may be used to compute the SUM of the MTDNet column. The result of this computation is $−327.25. The Aggregation result may be stored in a ReadyCache item and associated with a DataCache item. The ReadyCache item may be added to ReadyCache. This Engine Request is then considered complete and the result of $−327.25 is sent back to the user. In this embodiment of the present disclosure, this second Engine Request may be completed in less than $1/600^{th}$ of a second.

A third Engine Request may occur approximately 45 minutes after the first Engine Request according to an embodiment of the present disclosure. This third Engine Request may include the same Request Type, SmartView name and Filter/Criteria as the second Engine Request. The DataCache may be checked to see if any DataCache items match the SmartView name and DataCache parameters. In this embodiment, a DataCache item exists matching the SmartView name and DataCache parameters. The Refresh Interval is still set to 60 minutes, and as only 45 minutes have elapsed since the DataCache item was created, the request falls 15 minutes below the threshold for calling Sync. The DataCache item may then be validated and ReadyCache may be checked for a matching ReadyCache item using the SmartView name, DataCache parameters and ReadyCache parameters. In this embodiment, a ReadyCache item exists matching the requested Aggregation. The ReadyCache item may be fetched from the in-memory ReadyCache. The third Engine Request is then complete, and the result of $−327.25 is sent back to the user. In this embodiment, the total time for the third Engine Request to be completed may be less than $1/1200^{th}$ of a second.

A fourth Engine Request may be made 60 minutes after the first Engine Request was made in an embodiment of the present disclosure. In this embodiment, the Request Type, SmartView name and Filter/Criteria may be the same as the second and third Engine Requests. The DataCache may be checked to see if any DataCache items match the SmartView name and DataCache parameters. In this embodiment, a DataCache item exists matching the SmartView name and DataCache parameters. Again, the Refresh Interval has been set to 1 hour. Since 60 minutes have elapsed since the DataCache item was created, the DataCache item requires Sync, and a Data Request may be issued.

The Data Request may execute the SmartView by calling a Connector. The specific Connector may be BizNet. The Connector may call the BizNet Gateway and send an XML request using the Created Date as a Filter/Criteria on a column that may be called "When Modified" in addition to the normal DataCache parameters. The Connector may make a single call returning 10 records and taking approximately 3 seconds in this embodiment of the present disclosure. The Connector may merge the existing DataCache item and the result from SmartView execution. The Smart Data Engine may mark the "created date" for the DataCache item as the start time of the Data Request. The resulting DataCache item will contain the updated balances for all accounts for March 2016, and this may be added to DataCache. The Data Request is then considered complete, and the processing of the fourth Engine Request may continue.

In this embodiment, the Request Type is an Aggregation of monthly balance and the operation is (SUM(MTDNET)). The ReadyCache parameter (AccountNo='4020') may then be applied to a DataCache item matching the SmartView name and DataCache parameters. The resulting rows of data may be used to compute the SUM of the MTDNet column. The result of this computation may be $-483.17. The result may be stored in a ReadyCache item and associated with a DataCache item. The ReadyCache item may be added to ReadyCache. The fourth Engine Request may then be considered complete and the result of $-483.17 may be sent back to the user. In this embodiment, the total time for the fourth Engine Request may be 3 seconds.

In this embodiment of the present disclosure, the user may reach the end of a session. A "Session" is a period of time of use of the Smart Data Engine. At this point, the Smart Data Engine may receive a command to end the session, and all DataCache items and ReadyCache items may be serialized to disk. The total time for this step to occur may vary depending on how much data was used during the session.

When the user starts a new session, the Smart Data Engine may then start and recognize that data is available that has been serialized to disk; however, the Smart Data Engine may not load that data in memory. Instead, the Smart Data Engine may wait until a new Engine Request has been received before checking the local disk and de-serializing it to in-memory. "De-serializing" may be referred to as the process of extracting data from the local disk drive and placing that data into in-memory.

The user may make a first Engine Request with the Request Type of Aggregation. In this embodiment, no DataCache items exist for the first Engine Request. A Data Request may be issued to execute SmartView, and the resulting DataCache item may be added to DataCache. Also, a ReadyCache item may not exist for the requested Aggregation so the Aggregation may be executed against the DataCache item. The resulting ReadyCache item may be added to ReadyCache. The ReadyCache item may then be fetched from the in-memory and returned to a user.

A second Engine Request may be made with the same Request Type, SmartView name and Filter/Criteria as the first Engine Request. A DataCache item may be found that matches the second Engine Request. This DataCache item is valid and does not need Sync. A ReadyCache item also may exist that matches the requested Aggregation, and the ReadyCache item may be fetched from the in-memory ReadyCache and returned to the user.

A third Engine Request may be made with the same Request Type and SmartView name but different Filter/Criteria when compared to the prior Engine Requests. The DataCache item may exist matching the Engine Request; it may be valid and does not need Sync. However, a ReadyCache item may not exist for the requested Aggregation. The Aggregation may be executed against the DataCache item, and the resulting ReadyCache item may be added to ReadyCache. The ReadyCache may be fetched from the in-memory ReadyCache and returned to the user.

A fourth Engine Request may be made with the same Request Type, SmartView name and Filter/Criteria. A DataCache item may exist matching the Engine Request; however, it is not valid and requires Sync. A Data Request may be issued to execute SmartView. The resulting DataCache item may be added to DataCache overwriting the existing DataCache item and disposing of the existing ReadyCache items associated with the DataCache item. The ReadyCache item does not exist for the requested Aggregation. Accordingly, the Aggregation may be executed against the DataCache item. The resulting ReadyCache item may be added to ReadyCache. The ReadyCache item may be fetched from the in-memory ReadyCache and returned to the user.

Figure 2:
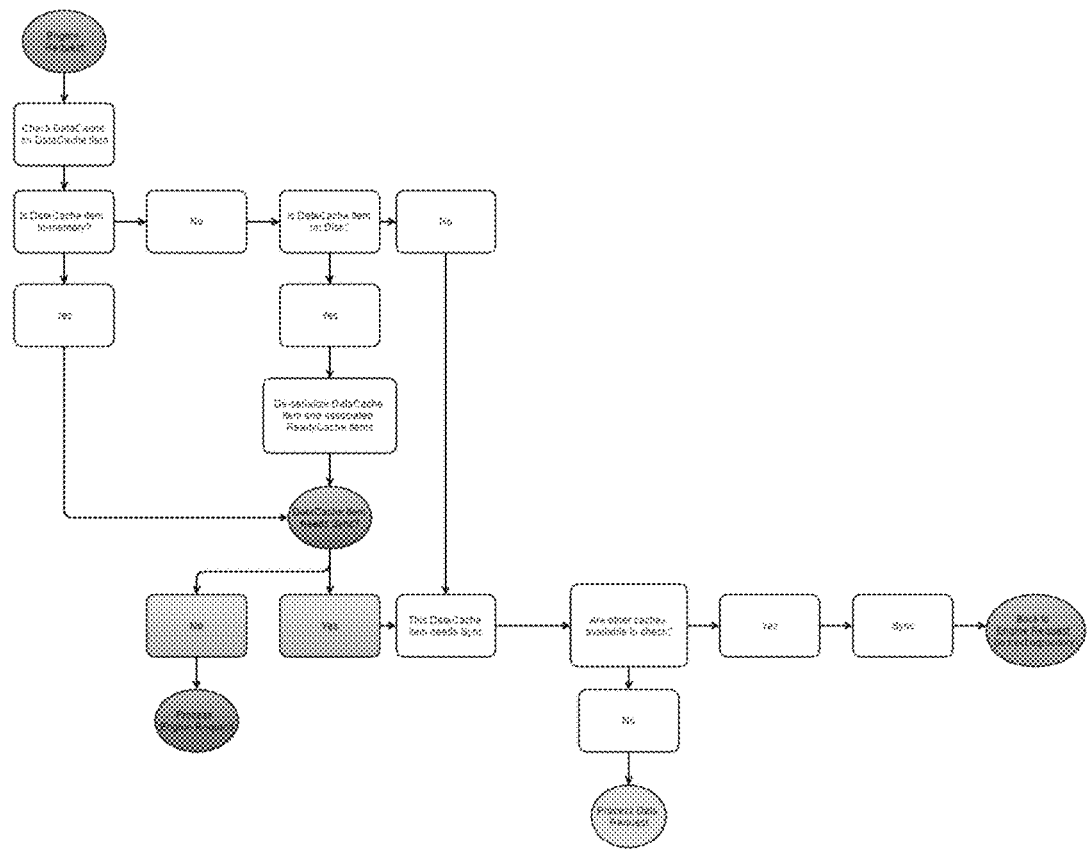
FIG. 2 depicts a flow chart for moving an Engine Request into the system according to an embodiment of the present disclosure.

Taking into account the examples previously described, FIG. 2 depicts a flow chart for moving an Engine Request into the system according to an embodiment of the present disclosure. An Engine Request may be made, and the DataCache may be checked for a DataCache item. If the DataCache item is not in-memory, the system may then check to see if the DataCache item is on disk. If the DataCache item is on disk, the DataCache item and associated ReadyCache items may be de-serialized. Once de-serialized (i.e., if the DataCache item was on disk) or if the DataCache item was in-memory, the system may determine whether the DataCache item needs Sync. If it does not need Sync, the Engine Request may be processed. If Sync is needed, either because the DataCache item was not on disk or it was on disk and has been de-serialized, then the system may determine if there are other caches available to check. If there are no other caches to check, the Data Request may be processed. If there are other caches to check, Sync may occur and then the system may go back to the Engine Request in the next repository.

Figure 3:
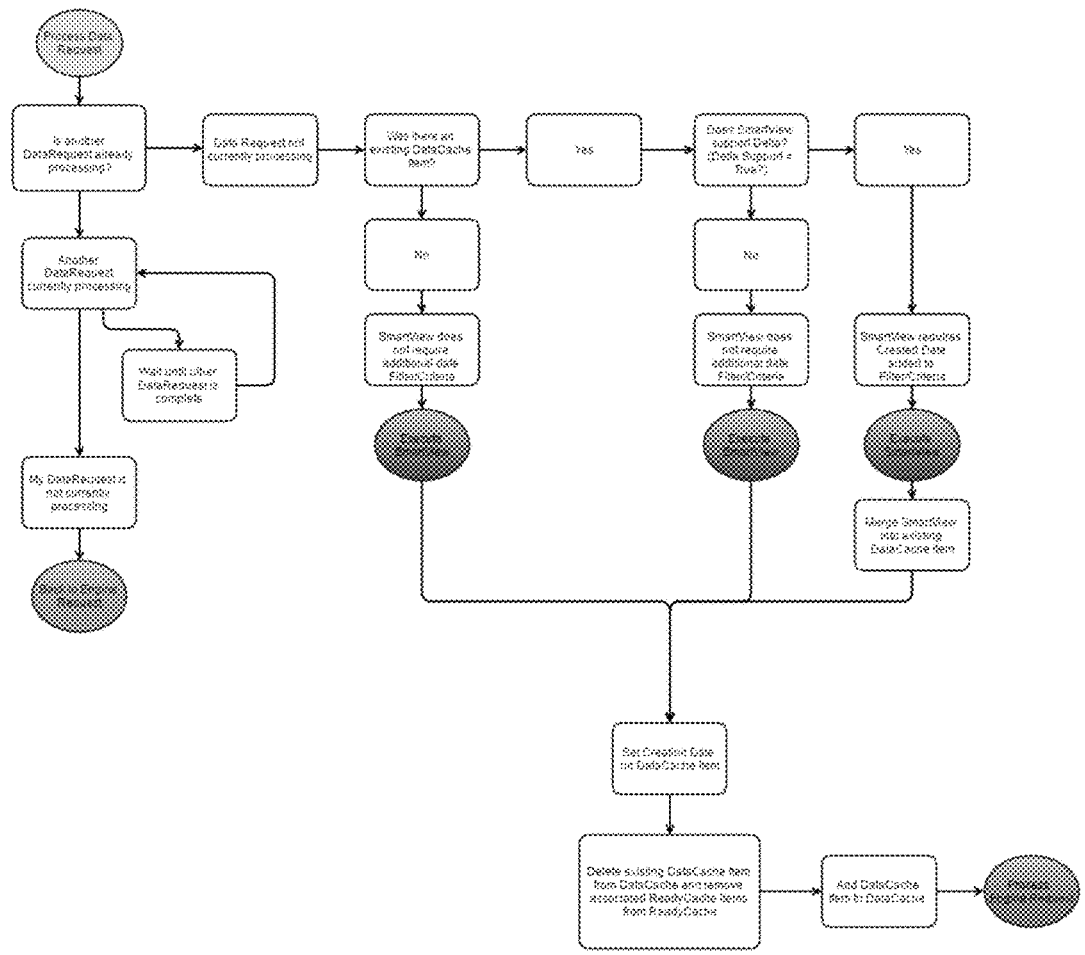
FIG. 3 depicts a flow chart depicting processing of a Data Request according to an embodiment of the present disclosure.

FIG. 3 depicts a flow chart depicting processing of a Data Request, such as if a determination is made that there are no other caches available to check (see FIG. 2). As depicted in FIG. 3, the system may query whether another Data Request is already processing. If another Data Request is currently processing, the system may wait until the other Data Request is complete, or it may determine that the Data Request is not currently processing, in which case the system may return back to the Engine Request.

If the Data Request is not currently processing, the system may query whether there was an existing DataCache item. If there was not an existing DataCache item and SmartView does not require additional Filter/Criteria, SmartView may be executed. If there is an existing DataCache item, the system may query whether SmartView supports Delta (i.e., Delta Support=True). If SmartView does support Delta, the SmartView may require the "created date" to be added to Filter/Criteria; then, SmartView may be executed and SmartView may be merged into the existing DataCache item. If SmartView does not support Delta, then SmartView may not require additional date Filter/Criteria, and SmartView may be executed.

Once SmartView has been executed, "creation date" may be set on the DataCache item. The existing DataCache item may then be deleted from DataCache, and associated ReadyCache items may be removed from ReadyCache. The DataCache item may then be added to DataCache, and the Engine Request may be processed.

Figure 4:
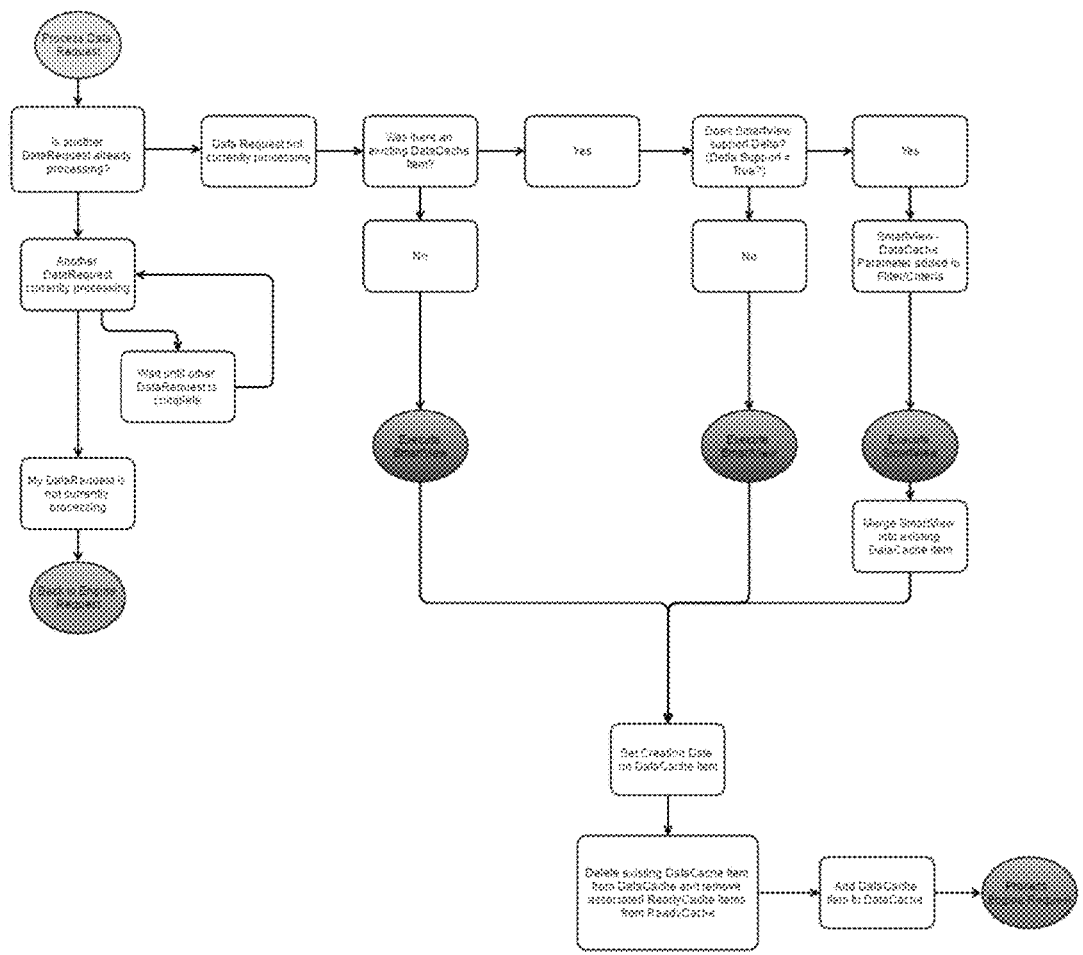
FIG. 4 depicts processing of an Engine Request according to an embodiment of the present disclosure.

FIG. 4 depicts processing of an Engine Request according to an embodiment of the present disclosure. As previously discussed, there may be two Request Types: Aggregation and DataSet. As depicted in FIG. 4, if the Request Type is Aggregation, ReadyCache may be checked for the ReadyCache item. If the ReadyCache item is found in-memory, the ReadyCache item may be returned. If the ReadyCache item is not found in-memory, Aggregation may be executed, the ReadyCache item may be added to ReadyCache, and the ReadyCache item may be returned. If the Request Type is DataSet, Filter/Criteria may be applied, and the DataSet may be returned.

Figure 5:
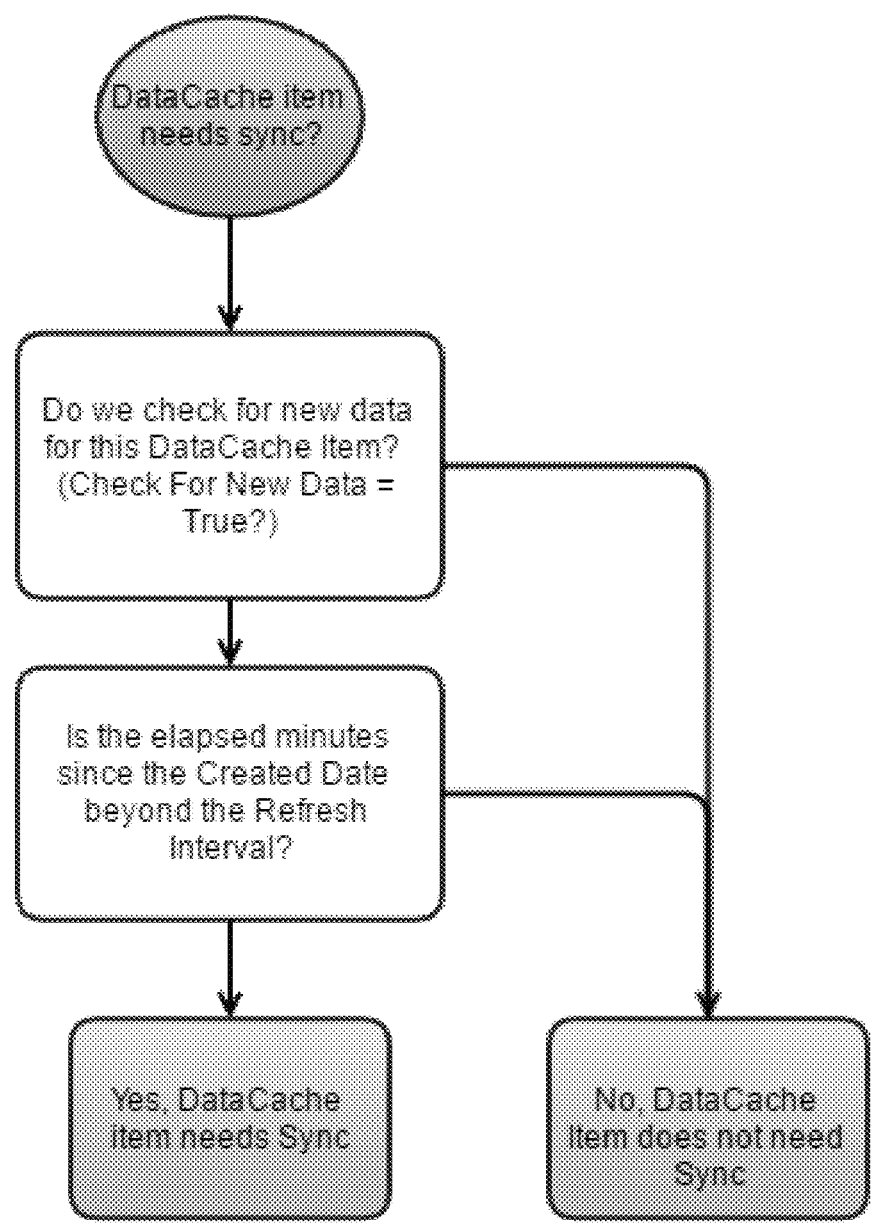
FIG. 5 depicts a flow chart for evaluation of whether a DataCache item needs Sync according to an embodiment of the present disclosure.

FIG. 5 depicts a flow chart for evaluation of whether a DataCache item needs Sync according to an embodiment of the present disclosure. In this embodiment, a query is made to check for new data for the DataCache item at issue (i.e., check for new data=true). A query also may be made to determine if the elapsed minutes since the "created date" is beyond the Refresh Interval. If there is no new data or the elapsed minutes are not beyond the Refresh Interval, no Sync is needed; however, if there is a need to check for new data and the elapsed minutes are beyond the Refresh Interval, the DataCache item needs Sync.

Figure 6:
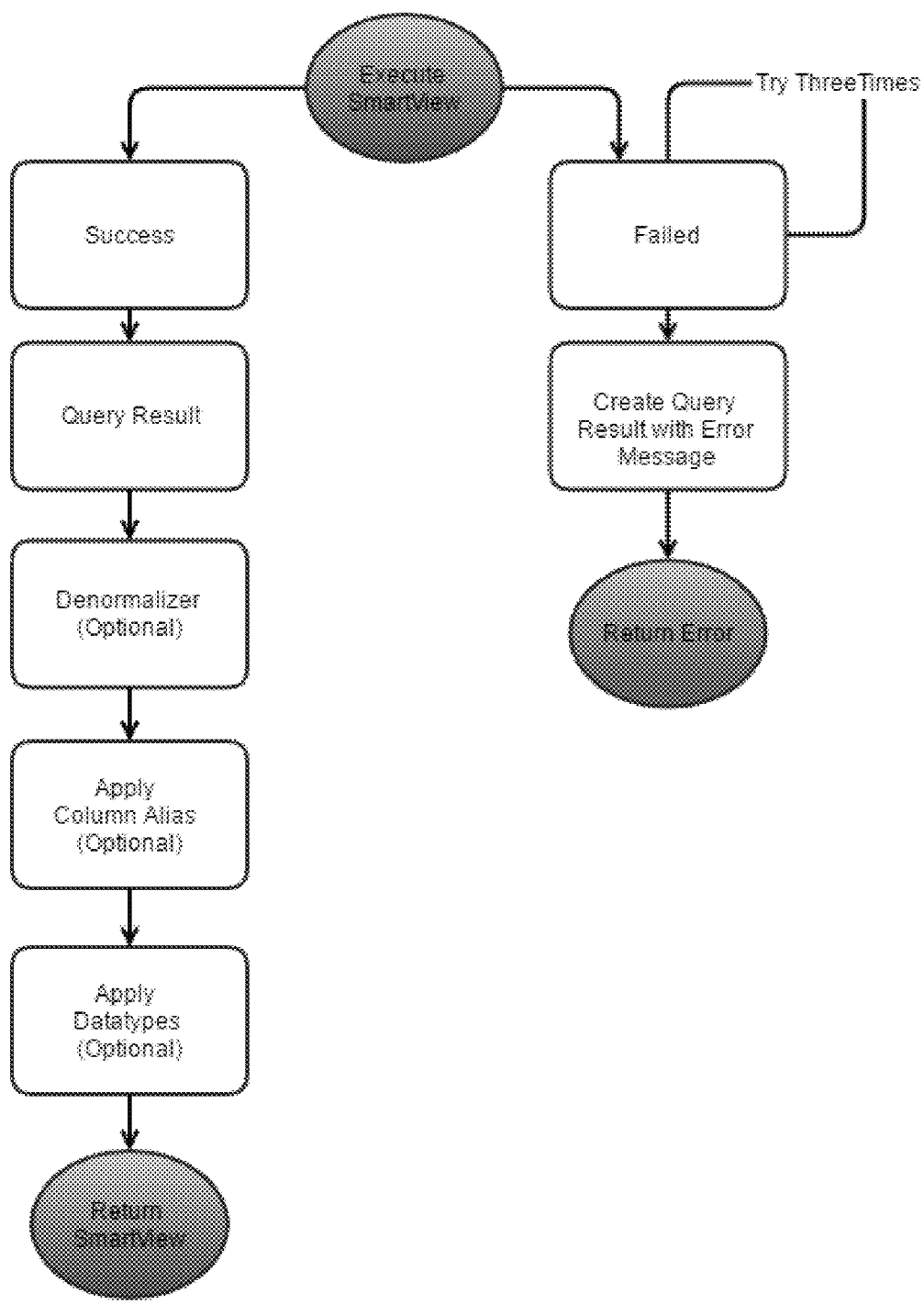
FIG. 6 depicts a flow chart for execution of SmartView according to an embodiment of the present disclosure.

FIG. 6 depicts a flow chart for execution of SmartView according to an embodiment of the present disclosure. In this embodiment, execution may be a success or a failure. If execution is successful, a query result may be provided. There also may be some optional steps as depicted in FIG. 6 including denormalization, application of a column alias, and application of data types. One or more of these steps may be performed according to embodiments of the present disclosure, and SmartView may be returned. If execution of SmartView is a failure, the system may allow for one or more re-tries (i.e., in this embodiment, three re-tries are provided), and upon failure, a query result with an error message may be created, and an error may be returned.

Figure 7:
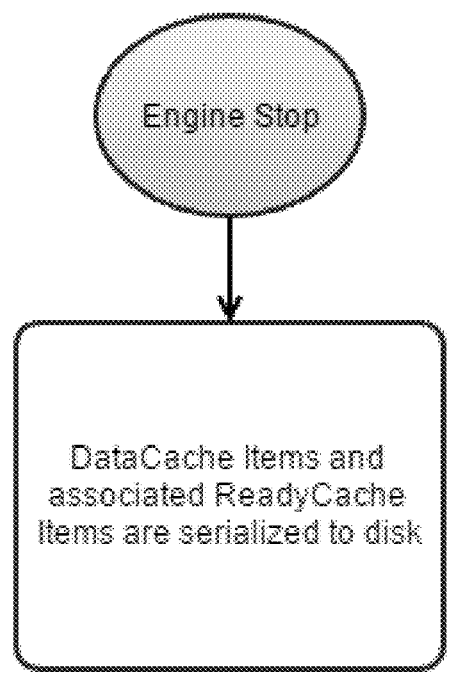
FIG. 7 depicts a flow chart of what occurs when there is an engine stop according to an embodiment of the present disclosure.

FIG. 7 depicts a flow chart of what occurs when there is an engine stop according to an embodiment of the present disclosure. When there is an engine stop, DataCache items and associated ReadyCache items may be serialized to disk.

The Smart Data Engine according to embodiments of the present disclosure may provide benefits in performance, flexibility and cost. The Smart Data Engine may cache data in an intelligent way which may minimize retrieval times and simplify authentication. The Smart Data Engine also may serve to avoid repeated requests of the same set of data from off-premises by maintaining a data cache on the local computer that is ready to be retrieved and is tailored to the user. Use of the Smart Data Engine may avoid repeated Aggregation requests for the same set of data by maintaining an additional cache tailored for Aggregations on the local computer ready to be retrieved.

The Smart Data Engine according to embodiments of the present disclosure may allow end users to retrieve data in a usable format and then easily create ad hoc reporting or perform analysis on the exposed data on the fly. Given the architecture of the Smart Data Engine solution, an end user may select from defined ready-to-use SmartViews of data and determine policies of the cached data as needed. This solution may simplify connectivity to multiple types of data sources, including but not limited to, cloud data, relational databases, as well as on-premise/off-premise data.

End users may request new information from the exposed data which can be stored in memory dynamically on a going forward basis. This may save time and money particularly when there may be repeated requests for the same data over time. The cost in both time and dollars may be lower than existing solutions. The cost to maintain may be lower as end users have the flexibility to request additional data and manipulate the presence of the data as opposed to engaging a consultant or IT professional.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method for using cached data from external sources to create, store, and update aggregations of the cached data, the method comprising:
   receiving a first Engine Request, the Engine Request including a Request Type of Aggregation;
   querying whether a DataCache item exists for the first Engine Request;
   issuing a Data Request to execute SmartView when no DataCache item exists for the first Engine Request;
   returning a DataCache item in response to the Data Request;
   querying whether a ReadyCache item exists for the Request Type of Aggregation;
   executing Aggregation against the DataCache item when the ReadyCache item does not exist;
   adding the DataCache item returned in response to the Data Request to DataCache;
   adding the ReadyCache item returned in response to the Aggregation to an in-memory ReadyCache;
   fetching the ReadyCache item from the in-memory ReadyCache;
   making a second Engine Request, the second Engine Request having an identical Request Type of Aggregation and Filter/Criteria as the first Engine Request;
   querying whether a DataCache item exists matching the second Engine Request;
   querying whether a ReadyCache item exists for the Request Type of Aggregation;
   fetching the ReadyCache item from the in-memory ReadyCache when the ReadyCache item exists for the Request Type of Aggregation; and
   making an additional Engine Request,
   wherein when the additional Engine Request has an identical Request Type of Aggregation but different Filter/Criteria as the first Engine Request,
      querying whether a DataCache item exists matching the additional Engine Request;

querying whether a ReadyCache item exists for the Request Type of Aggregation;
executing Aggregation against the DataCache item to return the ReadyCache item when no ReadyCache item exists for the Request Type of Aggregation;
adding the returned ReadyCache item to ReadyCache;
fetching the ReadyCache item from the in-memory ReadyCache;
wherein when the additional Engine Request has an identical Request Type and Filter/Criteria as the first Engine Request,
querying whether a DataCache item exists matching the additional Engine Request;
adding a resultant DataCache item to DataCache overwriting an existing DataCache item and disposing of existing ReadyCache items associated with the existing DataCache item;
querying whether a ReadyCache item exists for the Request Type of Aggregation;
executing Aggregation against the resultant DataCache item when no ReadyCache item exists for the Request Type of Aggregation;
adding a resultant ReadyCache item to the in-memory ReadyCache;
fetching the resultant ReadyCache item from the in-memory ReadyCache; and
returning the resultant ReadyCache item to a user.

2. The method of claim 1 further comprising:
querying whether the DataCache item being processed by the current Engine Request is in-memory.

3. The method of claim 2 further comprising:
checking ReadyCache for a ReadyCache item when the currently processing Engine Request includes a Request Type of Aggregation; and
executing Aggregation when the ReadyCache item is not found in-memory; and
returning the ReadyCache item.

4. The method of claim 3 further comprising:
adding the ReadyCache item to ReadyCache after executing Aggregation when the ReadyCache item is not found in-memory.

5. The method of claim 4 further comprising:
applying Filter/Criteria when the currently processing Engine Request includes a Request Type of DataSet; and
returning a DataSet.

6. The method of claim 5 further comprising:
setting a creation date on the DataCache item;
deleting the existing DataCache item and removing associated ReadyCache items from ReadyCache;
adding the DataCache item to DataCache; and
processing an Engine Request.

7. The method of claim 1 wherein the executing step occurs when there is no existing DataCache item.

8. The method of claim 1 further comprising:
merging SmartView into the existing DataCache item when there is an existing DataCache item.

9. The method of claim 1 further comprising:
querying whether another Data Request is currently processing.

10. A method for using cached data from external sources to create, store and update aggregations of the cached data, the method comprising:
receiving a first Engine Request, the first Engine Request including a Request Type of Aggregation;
querying whether a DataCache item exists for the first Engine Request;
issuing a Data Request to execute SmartView when no DataCache item exists for the first Engine Request;
returning a DataCache item in response to the Data Request;
querying whether a ReadyCache item exists for the Request Type of Aggregation;
executing Aggregation against the DataCache item when the ReadyCache item does not exist;
adding the DataCache item returned in response to the Data Request to DataCache;
adding the ReadyCache item returned in response to the Aggregation to an in-memory ReadyCache;
fetching the ReadyCache item from the in-memory ReadyCache;
making a second Engine Request, the second Engine Request having an identical Request Type of Aggregation and Filter/Criteria as the first Engine Request;
querying whether a DataCache item exists matching the second Engine Request;
querying whether the DataCache item is valid and needs Sync, when a DataCache item exists matching the second Engine Request;
querying whether a ReadyCache item exists for the Request Type of Aggregation;
fetching the ReadyCache item from the in-memory ReadyCache when a ReadyCache item exists for the Request Type of Aggregation;
making an additional Engine Request; and
wherein when the additional Engine Request has an identical Request Type but different Filter/Criteria as the first Engine Request,
querying whether a DataCache item exists matching the additional Engine Request;
querying whether the DataCache item is valid and needs Sync when a DataCache item exists matching the second Engine Request;
querying whether a ReadyCache item exists for the Request Type of Aggregation;
executing Aggregation against the DataCache item to return a ReadyCache item when a ReadyCache item does not exist for the Request Type of Aggregation;
adding the returned ReadyCache item to ReadyCache; and fetching the ReadyCache item from the in-memory ReadyCache;
wherein the additional Engine Request has an identical Request Type and Filter/Criteria as the first Engine Request,
querying whether a DataCache item exists matching the additional Engine Request;
querying whether the DataCache item is valid and needs Sync;
issuing a Data Request to execute SmartView when the DataCache item is not valid and needs Sync;
adding a resultant DataCache item to DataCache overwriting an existing DataCache item and disposing of existing ReadyCache items associated with the existing DataCache item;
querying whether a ReadyCache item exists for the Request Type of Aggregation;
executing Aggregation against the resultant DataCache item when no ReadyCache item exists for the Request Type of Aggregation;
adding a resultant ReadyCache item to the in-memory ReadyCache;
fetching the resultant ReadyCache item from the in-memory ReadyCache; and
returning the resultant ReadyCache item to a user.

11. The method of claim 10 further comprising:
query whether the DataCache item is in-memory; and
query whether the DataCache item needs Sync.

12. The method of claim 11 further comprising:
checking ReadyCache for a ReadyCache item when no Sync is needed and the currently processing Engine Request includes a Request Type of Aggregation;
executing Aggregation when the ReadyCache item is not found in-memory; and
returning the ReadyCache item.

13. The method of claim 12 further comprising:
adding the ReadyCache item to ReadyCache after executing Aggregation when the ReadyCache item is not found in-memory.

14. The method of claim 13 further comprising:
applying Filter/Criteria when no Sync is needed and the currently processing Engine Request includes a Request Type of DataSet; and
returning a DataSet.

15. The method of claim 14 further comprising:
querying whether there is an existing DataCache item;
executing SmartView when the DataCache item is invalid and needs Sync;
setting a creation date on a DataCache item;
deleting the existing DataCache item and removing associated ReadyCache items from ReadyCache;
adding the DataCache item to DataCache; and
processing an Engine Request.

16. The method of claim 15 wherein the executing step occurs when one of the following items is true:
there is no existing DataCache item;
there is an existing DataCache item; and
Sync is needed.

17. The method of claim 16 further comprising:
merging SmartView into the existing DataCache item when there is an existing DataCache item and SmartView does support Delta.

18. The method of claim 17 further comprising:
querying whether another Data Request is currently processing.

19. A method for using cached data from external sources to create, store and update aggregations of the cached data, the method comprising:
receiving a first Engine Request, the Engine Request including a Request Type of Aggregation;
querying whether a DataCache item exists for the first Engine Request;
issuing a Data Request to execute SmartView when no DataCache item exists for the first Engine Request;
returning a DataCache item in response to the Data Request;
querying whether a ReadyCache item exists for the Request Type of Aggregation;
executing Aggregation against the DataCache item when no ReadyCache item exists;
adding the DataCache item returned in response to the Data Request to DataCache;
adding the ReadyCache item returned in response to the Aggregation to an in-memory ReadyCache;
fetching the ReadyCache item from the in-memory ReadyCache;
making a second Engine Request, the second Engine Request having an identical Request Type of Aggregation and Filter/Criteria as the first Engine Request;
querying whether a DataCache item exists matching the second Engine Request;
querying whether the DataCache item is valid and needs Sync, when a DataCache item exists matching the second Engine Request;
querying whether a ReadyCache item exists for the Request Type of Aggregation;
fetching the ReadyCache item from the in-memory ReadyCache when a ReadyCache item exists for the Request Type of Aggregation; and
making an additional Engine Request,
wherein when the additional Engine Request has an identical Request Type but different Filter/Criteria as the first Engine Request,
querying whether a DataCache item exists matching the additional Engine Request;
querying whether the DataCache item is valid and needs Sync, when a DataCache item exists matching the second Engine Request;
querying whether a ReadyCache item exists for the Request Type of Aggregation; and executing Aggregation against the DataCache item to return a ReadyCache item when a ReadyCache item does not exist for the Request Type of Aggregation;
adding the returned ReadyCache item to ReadyCache; and fetching the ReadyCache item from the in-memory ReadyCache;
wherein when the additional Engine Request has an identical Request Type and Filter/Criteria as the first Engine Request,
querying whether a DataCache item exists matching the additional Engine Request;
querying whether the DataCache item is valid and needs Sync;
issuing a Data Request to execute SmartView when the DataCache item is not valid and needs Sync;
adding a resultant DataCache item to DataCache overwriting an existing DataCache item and disposing of existing ReadyCache items associated with the existing DataCache item;
querying whether a ReadyCache item exists for the Request Type of Aggregation;
executing Aggregation against the resultant DataCache item when no ReadyCache item exists for the Request Type of Aggregation;
adding a resultant ReadyCache item to the in-memory ReadyCache;
fetching the resultant ReadyCache item from the in-memory ReadyCache; and
returning the resultant ReadyCache item to a user.

20. The method of claim 19 further comprising:
querying whether the DataCache item is on disk when the DataCache item is not in-memory; and
querying whether the DataCache item needs Sync.

21. The method of claim 20 further comprising:
de-serializing the DataCache item and associated ReadyCache items when the DataCache item is on disk.

22. The method of claim 21 further comprising:
checking ReadyCache for a ReadyCache item when no Sync is needed and the currently processing Engine Request includes a Request Type of Aggregation;
executing Aggregation when the ReadyCache item is not found in-memory; and
returning the ReadyCache item.

23. The method of claim 22 further comprising:
adding the ReadyCache item to ReadyCache after executing Aggregation when the ReadyCache item is not found in-memory.

24. The method of claim 23 further comprising:

applying Filter/Criteria when no Sync is needed and the currently processing Engine Request includes a Request Type of DataSet; and returning a DataSet.

25. The method of claim 24 further comprising:

querying whether there is an existing DataCache item;

executing SmartView when the DataCache item is invalid and needs Sync;

setting a creation date on a DataCache item;

deleting the existing DataCache item and removing associated ReadyCache items from ReadyCache; and adding the DataCache item to DataCache; and processing an Engine Request.

26. The method of claim 25 wherein the executing step occurs when one of the following items is true:

there is no existing DataCache item;

there is an existing DataCache item; and

Sync is needed.

27. The method of claim 26 further comprising:

merging SmartView into the existing DataCache item when there is an existing DataCache item and SmartView does support Delta.

28. The method of claim 27 further comprising:

querying whether another Data Request is currently processing.

29. The method of claim 28 further comprising:

serializing the DataCache item and associated ReadyCache items on disk when an Engine Stop is issued.

* * * * *